United States Patent
Wang et al.

(10) Patent No.: US 11,163,994 B2
(45) Date of Patent: Nov. 2, 2021

(54) METHOD AND DEVICE FOR DETERMINING IRIS RECOGNITION IMAGE, TERMINAL APPARATUS, AND STORAGE MEDIUM

(71) Applicant: BEIJING 7INVENSUN TECHNOLOGY CO., LTD., Beijing (CN)

(72) Inventors: Qinmin Wang, Beijing (CN); Yunfei Wang, Beijing (CN); Tongbing Huang, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 47 days.

(21) Appl. No.: 16/703,104

(22) Filed: Dec. 4, 2019

(65) Prior Publication Data

US 2020/0193131 A1   Jun. 18, 2020

(30) Foreign Application Priority Data

Dec. 18, 2018   (CN) .......................... 201811551154.4

(51) Int. Cl.
*G06K 9/00* (2006.01)
*G06F 3/01* (2006.01)
*G06F 21/32* (2013.01)

(52) U.S. Cl.
CPC ........... *G06K 9/0061* (2013.01); *G06F 3/013* (2013.01); *G06F 21/32* (2013.01); *G06K 9/00604* (2013.01)

(58) Field of Classification Search
CPC ................................. G06F 21/32; G06F 3/013
See application file for complete search history.

(56) References Cited

U.S. PATENT DOCUMENTS

| | | | |
|---|---|---|---|
| 8,594,374 B1* | 11/2013 | Bozarth | G06K 9/00604 382/103 |
| 2015/0294464 A1* | 10/2015 | Kim | G06K 9/00597 382/117 |
| 2020/0019241 A1* | 1/2020 | Ninomiya | G06F 3/013 |
| 2020/0193131 A1* | 6/2020 | Wang | G06K 9/0061 |

FOREIGN PATENT DOCUMENTS

| | | |
|---|---|---|
| CN | 105426838 | 3/2016 |
| CN | 108881724 | 11/2018 |

* cited by examiner

*Primary Examiner* — Edward Park
(74) *Attorney, Agent, or Firm* — Brown Rudnick LLP (57) ABSTRACT

Provided are a method and a device for determining an iris recognition image, a terminal apparatus and a storage medium. The method includes: detecting a line of sight of a user; acquiring a user image based on the line of sight of the user; and if the user image meets a specified condition, determining the user image as the iris recognition image. With the method, the accuracy of iris recognition during iris recognition is improved, and the time for iris recognition is reduced.

17 Claims, 2 Drawing Sheets

METHOD AND DEVICE FOR DETERMINING IRIS RECOGNITION IMAGE, TERMINAL APPARATUS, AND STORAGE MEDIUM

CROSS-REFERENCE TO RELATED APPLICATION

The present application is based on and claims priority to Chinese Patent Application No. 201811551154.4, filed on Dec. 18, 2018, the disclosure of which is hereby incorporated by reference in its entirety.

TECHNICAL FIELD

The present application relates to the field of eye tracking technologies and, in particular, relates to a method and a device for determining an iris recognition image, a terminal apparatus, and a storage medium.

BACKGROUND

In modern society, identity recognition is becoming more and more important. Biometric recognition has been developed as a new identity recognition technology. Iris recognition is an important biometric feature recognition technology and has the characteristics of contact-free and high recognition precision.

Iris recognition is an identity recognition technology based on an iris in an eye. The iris recognition achieves identity authentication through feature description and matching of an iris image. Since the area of the human eye is small, in order to meet the requirement on image resolution of a recognition algorithm, it is necessary to increase the magnification of an optical system, which leads to a smaller imaging depth-of-field, and a better recognition effect is achieved only when a user stops at a suitable position and gazes at the lens. The iris recognition mainly includes steps of image acquisition, pre-processing, feature extraction and coding, classification and the like. One complete recognition costs long time, and poor image quality may be caused due to improper image pickup position and detection may fail consequently; hence, iris recognition is subjected to problems of long time and low identification precision.

SUMMARY

The embodiments of the present disclosure provide a method and a device for determining an iris recognition image, a terminal apparatus and a storage medium, which improve the precision of iris recognition and reduces the time of iris recognition.

In a first aspect, the embodiments of the present disclosure provide a method for determining an iris recognition image, and the method includes: detecting a line of sight of a user; acquiring a user image based on the line of sight of the user; and if the user image meets a specified condition, determining the user image as the iris recognition image.

In a second aspect, the embodiments of the present disclosure further provide a device for determining an iris recognition image, and the device includes a line of sight detection module, an image acquisition module, and an image determination module.

The line of sight detection module is configured to detect a line of sight of a user.

The image acquisition module is configured to acquire a user image based on the line of sight of the user.

The image determination module is configured to determine the user image as the iris recognition image if the user image meets a specified condition.

In a third aspect, the embodiments of the present disclosure further provide a terminal apparatus, and the apparatus includes: one or more processors; and a storage device configured to store one or more programs; where the one or more programs are executed by the one or more processors to implement the method for determining an iris recognition image provided by the embodiments of the present disclosure.

In a fourth aspect, the embodiments of the present disclosure further provide a computer-readable storage medium configured to store computer programs for implementing the method for determining an iris recognition image provided by the embodiments of the present disclosure when the programs are executed by a processor.

The embodiments of the present disclosure provide a method and a device for determining an iris recognition image, a terminal apparatus and a storage medium. The user image can be acquired based on the detected line of sight of the user, and if the user image meets the specified condition, the user image is determined to be an iris recognition image, so that iris recognition can be performed on the iris recognition image. That is, before iris recognition, the user images are screened by using the eye tracking technology to improve the precision of iris recognition in the iris recognition stage. Since the eye tracking is far higher in speed than the iris recognition, screening is performed before iris recognition, and a user image which is most suitable for iris recognition is selected, and thus the iris recognition time is effectively reduced.

DETAILED DESCRIPTION

Hereinafter the present disclosure will be further described in detail in conjunction with the drawings and embodiments. It may be understood that the specific embodiments set forth below are intended to illustrate and not to limit the present disclosure. Additionally, it is to be noted that, for convenience of description, only part, not all, of the structures related to the present disclosure are illustrated in the drawings.

Before exemplary embodiments are discussed more detailedly, it is to be mentioned that some of the exemplary embodiments are described as processing or methods depicted in flowcharts. Although the operations (steps) in a flowchart are described as processing in sequence, many of the operations may be implemented in parallel, concurrently, or simultaneously. Additionally, the sequences of the operations may be rearranged. The processing may be terminated when the operations of the processing are completed, but additional steps not included in the drawings may further be provided. The processing may correspond to a method, a function, a procedure, a subroutine, a subprogram, etc.

Embodiment 1

Figure 1:
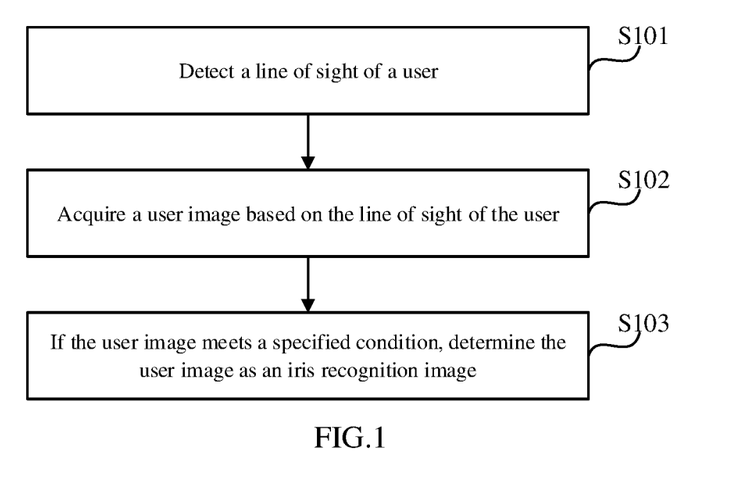
FIG. 1 is a schematic flowchart of a method for determining an iris recognition image according to an embodiment 1 of the present disclosure.

FIG. 1 is a schematic flowchart of a method for determining an iris recognition image according to the embodiment 1 of the present disclosure. The method is applicable to a scenario of determining an iris recognition image. Specifically, the method is applicable to a scenario of determining a user image used for an iris recognition before performing the iris recognition. The method may be performed by a device for determining an iris recognition image, where the device may be implemented by software and/or hardware, and is generally integrated on a terminal apparatus. In the present embodiment, the terminal apparatus includes, but is not limited to, apparatus such as a computer, a personal digital assistant, or a mobile phone.

As shown in FIG. 1, a method for determining an iris recognition image is provided in the embodiment 1 of the present disclosure, and the method includes the following steps.

In S101, a line of sight of a user is detected.

In the present embodiment, before an iris recognition image is determined, a line of sight of a user may be detected first, and the iris recognition image is determined based on the line of sight of the user. Specific means for detecting the line of sight of the user is not limited herein. For example, the line of sight may be determined through a capacitor, electromyography, a micro-electro-mechanical system (MEMS), a line of sight tracking device (such as an eye tracker), or an image. For example, a user image is acquired by an image capturing device, and the user image may be understood as an image containing an eye of the user. The image capturing device may acquire an image of the face of the user, an image of the whole body of the user or an eye image of the user, as the user image. In a case that the user image is the image of the face or the whole body of the user, the eye image may be extracted from the user image to determine the iris recognition image. The eye image may contain an environment in which the user is located.

It may be understood that an eye tracking technology may be used to determine the line of sight of the user in the present embodiment.

Eye tracking, also referred to as line of sight tracking, is a technology for estimating a line of sight and/or a gaze point of the eye by measuring the eye movement. The line of sight may be understood as a three-dimensional vector, and the gaze point may be understood as two-dimensional coordinates of a projection of the above three-dimensional vector onto a certain plane.

Hardware in the present embodiment may include a light source, an image capturing device, and a drive device.

The light source may be an infrared Light Emitting Diode (LED) light source since the infrared LED light source may not affect vision of the eye. There may be provided with two or more groups of infrared LED light sources and each group includes at least one LED light source. The respective infrared LED light sources may be arranged in a set manner, such as in a circle, a triangle, or the like. Human eye information may be shot under illumination provided by the light source and is then reflected into the image capturing device through the cornea, thereby serving as a parameter for eye tracking and line of sight estimation.

The image capturing device may be an infrared video camera device, an infrared image sensor, a camera or a video camera. The image capturing device may shoot the eye image required for eye tracking and iris recognition.

The drive device drives the image capturing device and the infrared LED light source to perform image pre-processing, communicate with other devices, or the like.

Specifically, the infrared LED light source irradiates the eye of the user, and the image capturing device shoots the eye of the user and shoots a reflection point of the infrared LED light source on the cornea which is a glint (also referred to as Purkinje image) to obtain an eye image containing the glint as the user image. Glints are the cornea reflections of intense virtual images of the designated light sources which can be captured by sensors of cameras. False glints mean bright spots captured by sensors other than said glints.

As the eyeball rolls, the relative positional relationship between the pupil center and the glint changes accordingly, and several corresponding acquired eye images each containing the glint may reflect a position change relationship. Therefore, the line of sight of the user may be determined based on the user image.

It may be understood that when the user image contains the glint, the line of sight of the user may be determined by analyzing the positional relationship between the glint feature and the pupil feature in the eye image in the present embodiment. When the user image does not contain the glint, in the step, the line of sight of the user may be determined by analyzing the pupil feature and a pre-built line of sight model, where the pre-built line of sight model may be a model determined when the user first uses the image capturing device for eye tracking. The pre-built line of sight model may be a function of the line of sight and a pupil feature. In determination of the function, the user may look at one or more preset target points in order to solve to-be-solved parameters in the function.

In S102, a user image is acquired based on the line of sight of the user. After the line of sight of the user is acquired, the user image may be acquired in the step. It may be understood that in response to the line of sight being determined through the user image, the user image that has been captured may be directly acquired in the step; in response to the line of sight not being determined through the user image, a current user image may be acquired through the image capturing device in the step. The line of sight of the user is firstly detected in the present embodiment. If the line of sight of the user is detected, the user image corresponding to the line of sight is acquired to decide whether the user image can be used as an iris recognition image.

In S103, if the user image meets a specified condition, the user image is determined as the iris recognition image.

In the present embodiment, the iris recognition image may be understood as a user image for iris recognition.

Specific content of the specified condition is not limited, and those skilled in the art may select corresponding conditions as the specified condition according to different decision contents. For example, it may be determined whether the user image can be used as an iris recognition image based on the resolution of the user image in the step. Correspondingly, the specified condition may be that the resolution is within a range of a resolution threshold. For the resolution threshold, a lowest resolution and a highest resolution may be defined, or only the lowest resolution is defined. It may also be determined in the step whether the user image can be used as an iris recognition image through the line of sight corresponding to the user image. Correspondingly, the specified condition may be that the line of sight matches or a line of sight angle difference is within a first preset range. The line of sight angle difference may be an angle difference between the line of sight corresponding to the user image and a specified line of sight. If it is determined through a gaze point whether the user image is used as the iris recognition image, the specified condition includes that a coordinate difference is within a second preset range; if it is determined through a user position whether the user image is used as the iris recognition image, the specified condition includes that a position difference is within a third preset range. The specific values of the first preset range, the second preset range, and the third preset range may be set according to actual situations, and are not limited herein.

The specified line of sight may be understood as a standard line of sight specified in advance. It may be understood that the specified line of sight may be either a front-view line of sight or an oblique-view line of sight. The front-view line of sight may be understood as a pre-stored line of sight when a normal user looks at the image capturing device from the front. The oblique-view line of sight may be understood as a pre-stored line of sight when a patient with an eye disease looks at the image capturing device from the front.

It may be understood that the manner of acquiring the specified line of sight is not limited in the present embodiment, and the specified line of sight may be preset or may be determined by recognizing an identity of a user. If the specified line of sight is determined by recognizing the user identity, the manner in which the user is identified is not limited. For example, a feature such as a user voice or a fingerprint that can uniquely identify the user may be used for identity recognition.

If it is determined through the line of sight corresponding to the user image whether the specified condition is met, the line of sight of the user may be compared with the specified line of sight to determine whether the user is looking at the image capturing device from the front at this time in the step. If the line of sight is consistent with the specified line of sight or the angle difference between the line of sight and the specified line of sight is within the first preset range, the user image corresponding to the line of sight may be used as the iris recognition image for iris recognition; otherwise, the method continues to detect the line of sight of the user until the acquired user image meets the specified condition.

In the step, it is determined whether the user image meets the specified condition to select an image suitable for iris recognition. For example, by comparing the line of sight with the specified line of sight, the user image when the user looks at the image capturing device from the front is selected, and the user image may be regarded as the image most suitable for iris recognition, so that the iris recognition precision can be effectively improved and time spent on recognition can be reduced by using the user image for iris recognition.

The iris recognition of the user image may include pre-processing (for example, denoising) of the eye in the user image, then extracting an iris feature from the pre-processed image, and comparing the extracted iris feature with a preset iris feature to obtain an iris recognition result. The preset iris feature may be understood as an iris feature that is preset according to requirements. For example, when iris recognition is used for identity authentication, the preset iris feature may be pre-recorded iris information of a user.

It may be understood that the iris may be an annular portion between the black pupil and the white sclera, and for an individual user, the structure of the iris is unique and hardly changes throughout his/her life. Therefore, the iris is widely used for identity recognition in various environments. The iris feature may include features such as spots, filaments, crowns, crypts, and the like of the eye.

The present embodiment 1 of the present disclosure provides a method for determining an iris recognition image. With the above method, the user image can be acquired based on the detected line of sight of the user, and if the user image meets the specified condition, the user image is determined to be the iris recognition image, so that iris recognition may be performed on the iris recognition image. That is, before iris recognition, the user images are screened by using the eye tracking technology to improve the precision of iris recognition in the iris recognition stage. Since the eye tracking is far higher in speed than the iris recognition, screening is performed before iris recognition, and a user image which is most suitable for iris recognition is selected, and thus time spent on iris recognition is effectively reduced.

Embodiment 2

Figure 2A:
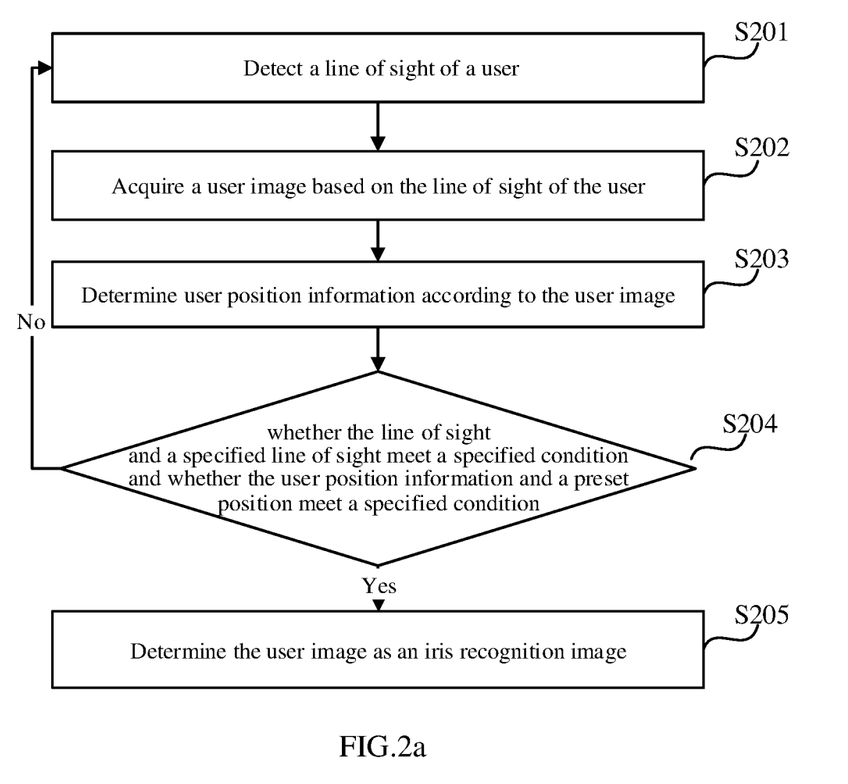
FIG. 2a is a schematic flowchart of a method for determining an iris recognition image according to an embodiment 2 of the present disclosure.

FIG. 2a is a schematic flowchart of a method for determining an iris recognition image according to the embodiment 2 of the present disclosure, and the present embodiment 2 is optimized based on foregoing embodiments. In the present embodiment, the optimization includes: if the user image does not meet the specified condition, the method returns to an operation of acquiring the line of sight of the user, until the user image meets the specified condition.

Further, the optimization of the present embodiment further includes: determining user position information according to the user image; and correspondingly, if the user image meets the specified condition, determining that the user image is an iris recognition image. Specifically, if the line of sight and the specified line of sight meet the specified condition and the user position information and a preset position meet the specified condition, the user image is determined as an iris recognition image. Correspondingly, the specified condition includes that a line of sight angle difference is within a first preset range and that a position difference is within a third preset range. For the content not described in detail in the present embodiment, reference may be made to the embodiment 1.

As shown in FIG. 2a, the method for determining an iris recognition image is provided in the embodiment 2 of the present disclosure and includes the following steps.

In S201, a line of sight of a user is detected.

In the present embodiment, the line of sight of the user may be determined by analyzing the user image, for example: feature information of the user is determined according to the user image, where the feature information includes a glint feature and a pupil feature; and the line of sight of the user is determined according to the feature information.

The feature information may be understood as an eye feature in the user image. The eye feature may include: a pupil position, a pupil shape, an iris position, an iris shape, an eyelid position, a canthus position, and/or a glint position, and the like. The glint feature may be understood as glint information in the user image, and the glint feature may include a glint center position (i.e., a glint center), a glint size, a glint radius, and/or a glint shape, and the like. The pupil feature may be understood as pupil information in the user image, and the pupil feature may include a pupil center position (i.e., a pupil center), a pupil size, a pupil radius, and/or a pupil shape, and the like.

In the process of determining the line of sight of the user, the feature information of the user may be determined through image recognition on the user image, and the feature information may include the glint feature and the pupil feature. Specifically, the feature information of the user may be determined according to the morphological transformation of the eye image in the process of determining the line of sight of the user. For example, the feature information of the user is determined through threshold processing based on gray values of the eye image.

After the feature information of the user is determined according to the user image, the line of sight of the user may be determined according to the feature information. Specifically, the line of sight of the user may be determined through a positional relationship between the glint feature and the pupil feature. It may be understood that when the line of sight of the user changes, the positional relationship between the glint feature and the pupil feature may change accordingly. Therefore, the line of sight of the user may be determined through the relative positional relationship between the glint feature and the pupil feature.

Figure 2B:
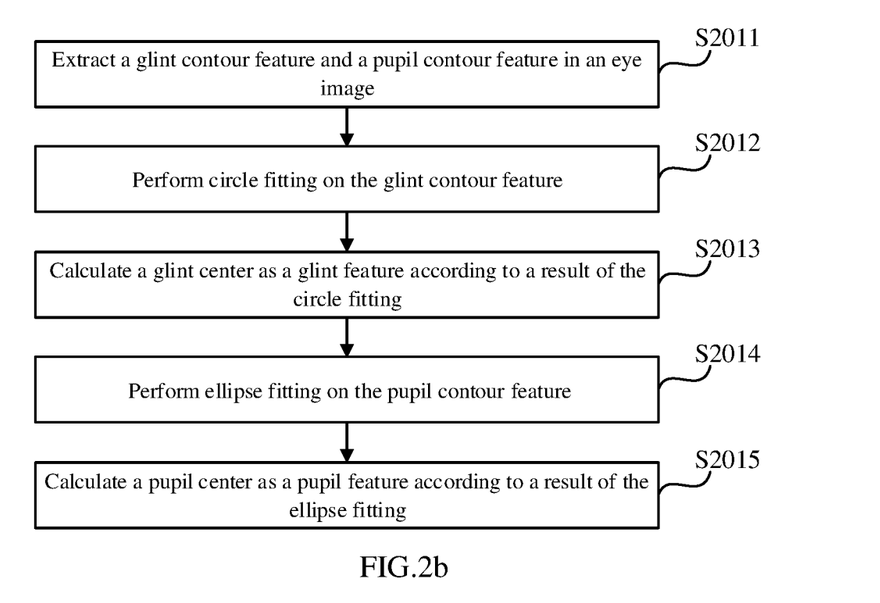
FIG. 2b provides a flowchart illustrating implementation of determining user feature information according to the embodiment 2 of the present disclosure.

FIG. 2b provides a flowchart of illustrating implementation of determining user feature information according to the embodiment 2 of the present disclosure. Specifically, as shown in FIG. 2b, the step of determining user feature information may include the following operations.

In S2011, a glint contour feature and a pupil contour feature in the eye image are extracted.

In the present embodiment, the glint contour feature may be understood as information of a glint contour in the eye image, such as position information and shape information of the glint contour. The pupil contour feature may be understood as information of a pupil contour in the eye image, such as position information and shape information of the pupil contour.

When determining the feature information of the user according to the user image, threshold processing may be first performed on the eye image included in the user image, and the glint contour feature and the pupil contour feature in the eye image are extracted to determine the glint feature and the pupil feature of the user based on the glint contour feature and the pupil contour feature.

In S2012, circle fitting is performed on the glint contour feature.

In the present embodiment, after the glint contour feature is extracted from the eye image, fitting may be performed on the glint contour feature in the step to form a curve which is similar to a circle. The technical means for circle fitting is not limited here, and a mean value method, a weighted mean method, or a least-squares method may be employed.

In S2013, a glint center is calculated as the glint feature according to a result of the circle fitting.

After fitting of the glint contour feature, a curve which is similar to a circle may be formed, and the center of the curve which is similar to the circle may be calculated in the step, and the center is taken as the glint center. The glint center may be understood as the glint feature for determining the line of sight of the user.

In S2014, ellipse fitting is performed on the pupil contour feature.

In the present embodiment, after the pupil contour feature is extracted from the eye image, ellipse fitting may be performed on the pupil contour feature to form a curve similar to an ellipse. The technical means for ellipse fitting is not limited here, and a direct calculation method, a quadratic polynomial fitting method, a standard equation fitting method may be employed.

In S2015, a pupil center is calculated as the pupil feature according to a result of the ellipse fitting.

After ellipse fitting of the pupil contour feature, a curve which is similar to an ellipse may be formed, and an intersection of the major axis and the minor axis of the curve which is similar to the ellipse may be calculated as the pupil center in the step. The pupil center may be understood as the pupil feature for determining the line of sight of the user.

In S202, a user image is acquired based on the line of sight of the user.

In S203, user position information is determined according to the user image.

In the present embodiment, the user position information may be understood as a position of the user relative to the image capturing device. The user position information may include distance information and angle information of the user from the image capturing device.

When the user is at different angles and distances from the image capturing device, the eyes in the user images acquired by the image capturing device may have different sizes and positions. Specifically, a comparison may be made based on the user image and a reference image in the step, and the user position information is determined based on an deviation between the user image and the reference image.

The reference image may be understood as a pre-recorded image containing environmental information when the user looks at the reference point from the front. The reference image may be used as a referential image for determining the user position information. A reference point may be understood as a preset point to be gazed by the user.

In S204, it is determined whether the line of sight and the specified line of sight meet the specified condition and whether the user position information and the preset position meet the specified condition. If yes, S205 is executed; if not, S201 is executed.

After the line of sight of the user and the user position information are determined, the determined line of sight may be compared with the specified line of sight to determine whether the specified condition is met and determine whether the user is currently looking at the image capturing device from the front, where the specified condition may include that a line of sight angle difference is within the first preset range, that is, the line of sight angle difference between the line of sight corresponding to the user image and the specified line of sight is within the first preset range; the position information of the user is compared with the preset position to determine whether the specified condition is met and determine whether the current position of the user relative to the image capturing device is suitable, where the specified condition may include that the position difference is within a third preset range, that is, the position difference between the user position information and the preset position is within the third preset range.

The advantage of above setting is that the user image selected for iris recognition is not only the image when the user looks at the image capturing device from the front, but also the image when the user is located at a most suitable position for iris recognition relative to the image capturing device, and iris recognition may be performed more accurately by using the user image as an iris recognition image. That is, a most friendly iris recognition image is provided before iris recognition, which is beneficial for feature extraction and coding in iris recognition.

If the line of sight and the specified line of sight meet the specified condition and the user position information and the preset position meet the specified condition, S205 may be performed; otherwise, the method continues to detect the line of sight of the user, that is, S201 may be performed until the line of sight and the specified line of sight meet the specified condition and the user position information and the preset position meet the specified condition.

It should be noted that, in the present embodiment, the specified condition includes that the line of sight angle difference is within the first preset range and that the position difference is within the third preset range.

For example, when the line of sight is compared with the specified line of sight, the specified condition may be that the line of sight angle difference between the line of sight and the specified line of sight is within the first preset range. When the user position information is compared with the preset position, the specified condition may be that the position difference between the user position information and the preset position is within the third preset range.

In addition, in order to improve the accuracy of determining the iris recognition image, it is also possible to preset front-view lines of sight corresponding to the users as specified lines of sight for different users respectively in the present embodiment. Through identity authentication of the user, a preset front-view line of sight corresponding to the user is selected. It should be noted that if the user is a patient with an eye disease, a front-view line of sight corresponding to the patient may be an oblique-view line of sight.

The step of performing identity authentication on the user to determine the specified line of sight of the user may include the following steps:

searching an identity database according to the user image to determine an eye situation of the user; and when the eye situation is normal, determining a front-view line of sight to be the specified line of sight; otherwise, determining an oblique-view line of sight to be the specified line of sight.

The identity database may be understood as a preset image database including information about eye situations of respective users. The identity database may store corresponding relationship between the user image corresponding to each user and the eye situation of the user. The eye situation of the user can be uniquely determined through the user image. The eye situation may include normal and abnormal. The specified line of sight of a user whose eye situation is normal may be the front-view line of sight. The specified line of sight of the user whose eye situation is abnormal may be the oblique-view line of sight. Therefore, when the eye situation is normal, the front-view line of sight is determined to be the specified line of sight; otherwise, the oblique-view line of sight is determined to be the specified line of sight.

It may be understood that when the eye situation is normal, the front-view line of sight determined to be the specified line of sight may be a preset standard front-view line of sight or may be the front-view line of sight of the user. When the eye situation is abnormal, the oblique-view line of sight of the user may be used as the specified line of sight.

Further, if the user image meets the specified condition, the step of determining that the user image is the iris recognition image includes the following steps:

determining coordinates of a corresponding gaze point according to the line of sight of the user;

if the coordinates of the gaze point and coordinates of an image capturing device meet the specified condition, determining the user image as the iris recognition image.

The line of sight may be understood as a three-dimensional vector, and the gaze point may be understood as two-dimensional coordinates of a projection of the three-dimensional vector onto a certain plane. The information of the gaze point may include the coordinates of the gaze point, a gaze depth and/or a gaze direction. It should be noted that the coordinates of the gaze point may be two-dimensional coordinates or three-dimensional coordinates.

The specific means for determining the coordinates of the corresponding gaze point according to the line of sight of the user is not limited herein. For example, the coordinates of the corresponding gaze point may be determined by projecting the line of sight onto a plane where the image capturing device is located.

In the present embodiment, after the coordinates of the gaze point are determined, the coordinates of the gaze point are compared with the coordinates of the image capturing device to determine whether the coordinates of the gaze point meet the specified condition. If the coordinates of the gaze point meet the specified condition, the corresponding user image may be determined as an iris recognition image; otherwise, the method continues to detect the line of sight of the user for analysis until the coordinates of the gaze point corresponding to the acquired user image meet the specified condition.

When it is determined whether the coordinates of the gaze point meet the specified condition, the specified condition may be that the coordinate difference is within the second preset range, that is, the coordinate difference between the coordinates of the gaze point corresponding to the user image and the coordinates of the image capturing device is within the second preset range.

Further, the specified condition includes that a line of sight angle difference is within the first preset range and/or a coordinate difference is within the second preset range.

It may be understood that, when determining the iris recognition image, it may be determined whether the line of sight and the specified line of sight meet the specified condition; and it may also be decided whether the coordinates of the gaze point and the coordinates of the image capturing device meet the specified condition. On the basis, it is also possible to determine the iris recognition image in conjunction with whether the user position information and the preset position meet the specified condition.

In S205, the user image is determined as the iris recognition image.

When the line of sight and the specified line of sight meet the specified condition and the user position information and the preset position meet the specified condition, it may be stated that currently the user is in the state of looking at the image capturing device from the front and is in a shooting position suitable for iris recognition. In the step, the user image corresponding to the line of sight may be used as the iris recognition image.

The present embodiment is exemplarily described below. In the present embodiment, the eye tracking technology is used to determine the optimal shooting position for the iris recognition, and then the iris recognition is performed on the eye image at the position. Specifically, the image capturing device shoots the eye image, and the light emitted by the LED light source is reflected by the corneas and imaged in the image capturing device (i.e., a glint is formed). The direction of the line of sight is calculated based on the positional relationship between the glint and the pupil. If it is calculated that the pupil center is at the center position and is in a front-view direction, it may be considered that the shooting position at this time is the most suitable position for iris recognition, and iris recognition may be performed on the image. On the basis of the above, the method for determining an iris recognition image may specifically include the following steps.

Firstly, the eye region is selected, that is, the image is input. Then the image region is detected, and the glint is detected to obtain a candidate region, and the pupil is detected to obtain the eye region. During the image acquisition, the exposure, gain, and LED brightness and darkness may be automatically adjusted at hardware and software levels.

Secondly, the corneal reflection point is detected according to the morphological transformation of the eye image, that is, threshold processing is performed in the candidate region and the contour information of the glint is extracted. Circle fitting is performed on the contour information of the glint, and then the center and the size of the glint are calculated according to the fitting result.

Then, the detection of the pupil center is performed, that is, the eye region is subjected to threshold processing and the contour information of the pupil is extracted. The pupil contour information around the glint is excluded based on the calculated center and size of the glint, and then the pupil contour information after exclusion is subjected to ellipse fitting, and the pupil center is calculated based on the ellipse fitting result.

Finally, the direction of the line of sight is calculated based on the calculated positional relationship between the pupil and the glint. If the user position is appropriate and the user looks at the lens from the front, the eye image corresponding to the line of sight may be subjected to iris recognition, that is, the eye image is used as the iris recognition image; otherwise, images are continuously input until the image of the user who has an appropriate position and who looks at the lens (i.e., the image capturing device) from the front is selected.

It may be understood that when the user is a patient with an eye disease, the line of sight when the user looks at the lens from the front may be an oblique-view line of sight. Correspondingly, the image corresponding to the oblique-view line of sight of the user may be selected for iris recognition.

Images are screened using the eye tracking technology before iris recognition. Due to the high accuracy of the eye tracking, high-quality eye images can be provided for iris recognition, iris recognition is always kept in the best state, and the accuracy, precision and efficiency of iris recognition are improved. In addition, the eye tracking is shorter in time and faster in speed than the iris recognition, and the best shooting position can be quickly screened out and the time for iris recognition can be reduced.

A method for determining an iris recognition image is provided by the embodiment 2 of the present disclosure, and the optimization includes a position determining operation, and the operation in case of not meeting the specified condition and the operation of determining the iris recognition image are embodied. With the method, the user image can be acquired according to the detected line of sight of the user, and the user position information is determined based on the user image to more accurately determine the iris recognition image. If the line of sight and the specified line of sight meet the specified condition and the user position information and the preset position meet the specified condition, the user image may be determined as the iris recognition image. The best shooting position can be quickly screened out by determination on the line of sight and user position information so as to provide high-quality images for iris recognition and improve the accuracy of the iris recognition. The eye tracking is shorter in time than the iris recognition. Before the iris recognition, the eye tracking technology is used to select the user image when the user is at the optimal position for the iris recognition. The time for iris recognition is effectively reduced and the operation efficiency of the iris recognition is improved.

Based on the above technical solutions, the step of determining the line of sight of the user according to the feature information may include: searching a pre-stored line of sight comparison table according to the glint center and the pupil center to determine the line of sight of the user.

The pre-stored line of sight comparison table may be understood as a pre-stored correspondence between the glint center, the pupil center, and the line of sight. Glint centers and pupil centers at different positions may correspond to different lines of sight. When the line of sight of the user is determined according to the feature information, the pre-stored line of sight comparison table may be searched according to the determined glint center and pupil center to acquire the corresponding line of sight.

Based on the above technical solutions, the step of determining the user position information according to the user image may include: determining an eye size according to the eye feature in the user image; and determining the user position information according to the eye size and a preset size comparison table, where the user position information includes distance information.

In the present embodiment, the eye size may be understood as the size of the eye of the user. The preset size comparison table may be understood as a preset comparison table of eye sizes and distance information. The distance information may be understood as the distance between the user and the image capturing device.

When the user position information is determined based on the user image, the eye feature in the user image may be recognized, and then the eye size is determined based on the recognized eye feature. After the eye size is determined, the preset size comparison table may be searched to determine the distance information and acquire the user position information. Therefore, based on the comparison of the distance information and the preset position, it is determined whether the current distance between the user and the image capturing device is appropriate, that is, whether the image capturing device may currently capture a clear eye image.

Embodiment 3

Figure 3:
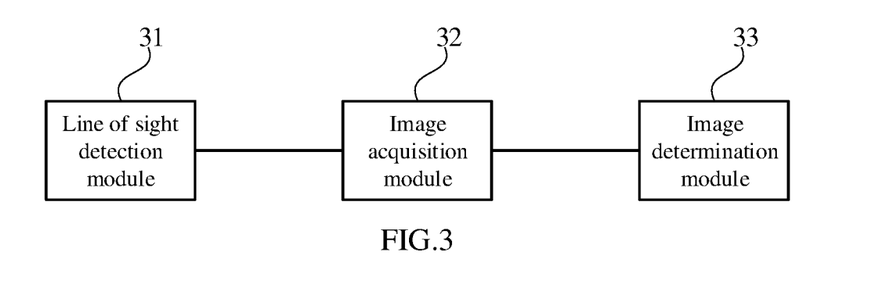
FIG. 3 is a schematic structural diagram of a device for determining an iris recognition image according to an embodiment 3 of the present disclosure.

FIG. 3 is a schematic structural diagram of a device for determining an iris recognition image according to the embodiment 3 of the present disclosure. The device is applicable to a scenario of determining an iris recognition image. Specifically, the device is applicable to a scenario of determining a user image for an iris recognition before the iris recognition, where the device may be implemented by software and/or hardware and is generally integrated on a terminal apparatus.

As shown in FIG. 3, the device for determining an iris recognition image includes: a line of sight detection module 31, an image acquisition module 32, and an image determination module 33.

The line of sight detection module 31 is configured to detect a line of sight of a user.

The image acquisition module 32 is configured to acquire a user image based on the line of sight of the user.

The image determination module 33 is configured to determine that the user image is an iris recognition image when the user image meets a specified condition.

In the present embodiment, in the device for determining an iris recognition image, firstly, the line of sight of the user is detected by the line of sight detection module 31; then, the user image is acquired by the image acquisition module 32 based on the line of sight of the user; and finally, when the user image meets the specified condition, the user image is determined as the iris recognition image by the image determination module 33.

The present embodiment provides a device for determining an iris recognition image. The user image can be acquired based on the detected line of sight of the user, and if the user image meets a specified condition, the user image is determined to be an iris recognition image, so that iris recognition may be performed on the iris recognition image. That is, before iris recognition, the user images are screened by using the eye tracking technology to improve the precision of iris recognition in the iris recognition stage. Since the eye tracking is far higher in speed than the iris recognition, screening is performed before iris recognition, and a user image which is most suitable for iris recognition is selected, and thus time spent on the iris recognition is effectively reduced.

Further, for the device for determining an iris recognition image, the following optimization is provided.

A position determination module is configured to determine user position information according to the user image; and correspondingly, the image determination module 33 is specifically configured to: when the line of sight and a specified line of sight meet the specified condition and the user position information and a preset position meet the specified condition, determine the user image as an iris recognition image, where the specified condition includes that the line of sight angle difference is within a first preset range and the position difference is within a third preset range.

Further, the position determination module is specifically configured to: determine an eye size according to an eye feature in the user image; determine the user position information according to the eye size and a preset size comparison table, where the user position information includes distance information.

Further, the optimized device for determining an iris recognition image includes: a returning module, which is configured to: when the user image does not meet the specified condition, return to acquire the line of sight of the user until the user image meets the specified condition.

Further, the image determination module 33 is specifically configured to: determine coordinates of a corresponding gaze point according to the line of sight of the user; and determine that the user image is the iris recognition image when the coordinates of the gaze point and coordinates of the image capturing device meet the specified condition. The specified condition includes: the line of sight angle difference is within the first preset range, and/or that a coordinate difference is within a second preset range.

The above-mentioned device for determining an iris recognition image can execute the method for determining an iris recognition image provided by any embodiment of the present disclosure, and has functional modules and beneficial effects corresponding to the executed method.

Embodiment 4

Figure 4:
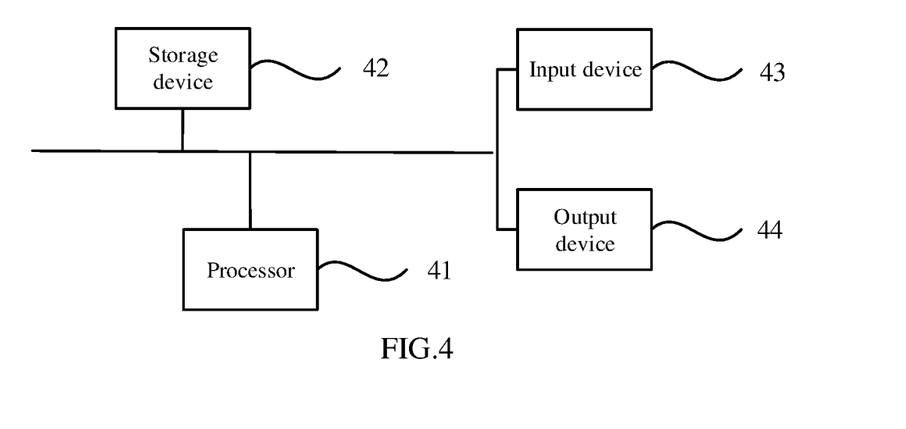
FIG. 4 is a schematic structural diagram of a terminal apparatus according to an embodiment 4 of the present disclosure.

FIG. 4 is a schematic structural diagram of a terminal apparatus according to the embodiment 4 of the present disclosure. As shown in FIG. 4, the terminal apparatus provided in the embodiment 4 of the present disclosure includes: one or more processors 41 and a storage device 42; the number of processors 41 in the terminal device may be one or more, and one processor 41 is taken as an example in FIG. 4; the storage device 42 is configured to store one or more programs; the one or more programs are executed by the one or more processors 41 so that the one or more processors 41 implement the method for determining an iris recognition image according to any one of the embodiments in the present disclosure.

The terminal apparatus may further include an input device 43 and an output device 44.

The processor 41, the storage device 42, the input device 43 and the output device 44 in the terminal apparatus may be connected via a bus or by other means, and are connected via a bus by way of example in FIG. 4.

The storage device 42 in the terminal apparatus is used as a computer readable storage medium for storing one or more programs, and the programs may be software programs, computer executable programs, and modules, such as the program instructions/modules (for example, the modules in the device for determining an iris recognition image shown in FIG. 3, include: a line of sight detection module 31, an image acquisition module 32, and an image determination module 33) corresponding to the method for determining an iris recognition image provided by the embodiment 1 or 2 of the present disclosure. The processor 41 runs the software programs, instructions and modules stored in the storage device 42 to execute function applications and data processing of the terminal apparatus, that is, to implement the methods for determining an iris recognition image in the method embodiments described above.

The storage device 42 may include a program storage region and a data storage region, where the program storage region may store an operating system and an application program required by at least one function while the data storage region may store data created depending on use of the terminal apparatus. In addition, the storage device 42 may include a high speed random access memory, and may also include a nonvolatile memory, such as at least one magnetic disk storage component, a flash component or another nonvolatile solid state storage components. In some examples, the storage device 42 may further include memory remotely located relative to the processor 41, and the memory may be connected to the device over a network. Examples of the preceding network include, but are not limited to, the Internet, an intranet, a local area network, a mobile communication network and a combination thereof.

The input device 43 may be configured to receive inputted digital or character information and to generate key signal input related to user settings and function control of the terminal apparatus. The input device 43 may include an image capturing device such as an infrared video camera device, an infrared image sensor, a camera or a video camera. The output deice 44 may include a display device such as a display screen and/or an infrared LED light source.

Moreover, when one or more programs included by the terminal apparatus are executed by the one or more processors 41, the one or more programs perform the following operations: detecting a line of sight of a user; acquiring a user image based on the line of sight of the user; and if the user image meets a specified condition, determining that the user image is an iris recognition image.

Embodiment 5

Embodiment 5 of the present disclosure provides a computer readable storage medium storing computer programs for executing a method for determining an iris recognition image when the programs are executed by a processor. The method includes: detecting a line of sight of a user; acquiring a user image based on the line of sight of the user; and if the user image meets a specified condition, determining that the user image is the iris recognition image.

Optionally, when the programs are executed by the processor, the programs may also be used to execute the method for determining an iris recognition image provided by any embodiment of the present disclosure.

The computer storage medium of the embodiment of the present disclosure may employ any combination of one or more computer readable media. The computer readable medium may be a computer readable signal medium or a computer readable storage medium. The computer readable storage medium may be, for example, but is not limited to, an electronic, magnetic, optical, electromagnetic, infrared, or semiconductor system, apparatus, or device, or any combination thereof. More specific examples (non-exhaustive lists) of computer readable storage media include: electrical connection with one or more wires, a portable computer magnetic disk, a hard disk, a random access memory (RAM), a read only memory (ROM), an erasable programmable read only memory (EPROM), a flash memory, an optical fiber, a portable Compact Disc Read-Only Memory (CD-ROM), an optical storage device, a magnetic storage device, or any suitable combination thereof. The computer readable storage medium may be any tangible medium including or storing a program that may be used by or may be used in connection with an instruction execution system, apparatus, or device.

The computer readable signal medium may include a data signal that is propagated in the baseband or as part of a carrier, where a computer readable program code is carried. Such propagated data signal may take a variety of forms including, but not limited to, an electromagnetic signal, an optical signal, or any suitable combination thereof. The computer readable signal medium may also be any computer readable medium other than a computer readable storage medium, and the computer readable medium may send, propagate, or transmit a program used by or used in connection with the instruction execution system, apparatus, or device.

The program code included on a computer readable medium may be transmitted by any suitable medium, including but not limited to wireless, wire, optical fiber cable, radio frequency (RF), and the like, or any suitable combination thereof.

The computer program code for performing the operations of the present disclosure may be written in one or more programming languages or a combination thereof, and the programming languages include an object-oriented programming language such as Java, Smalltalk, C++ and a conventional procedural programming language such as the "C" language or a similar programming language. The program code may be executed entirely on the users computer, partly on the user's computer, as a stand-alone software package, partly on the user's computer and partly on a remote computer, or entirely on the remote computer or server. In the case of involving the remote computer, the remote computer may be connected to the user's computer via any kind of network, including a local area network (LAN) or a wide area network (WAN), or may be connected to an external computer (e.g., via the Internet provided by an Internet service provider).

It is to be noted that the above are merely preferred embodiments of the present disclosure and the technical principles used therein. It will be understood by those skilled in the art that the present disclosure is not limited to the specific embodiments described herein. Those skilled in the art may make various apparent modifications, adaptations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A method for determining an iris recognition image, comprising:
   detecting a line of sight of a user;
   acquiring a user image based on the line of sight of the user; and
   in response to determining that the user image meets a specified condition, determining the user image as the iris recognition image;
   wherein the in response to determining that the user image meets a specified condition, determining the user image as the iris recognition image comprises:
   determining coordinates of a corresponding gaze point according to the line of sight of the user; and
   in response to determining that the coordinates of the gaze point and coordinates of an image capturing device meet a specified condition, determining the user image as the iris recognition image.

2. The method of claim 1, wherein the specified condition comprises at least one of: a line of sight angle difference is within a first preset range, or a coordinate difference is within a second preset range.

3. The method of claim 1, further comprising:
   in response to determining that the user image does not meet the specified condition, returning to acquire the line of sight of the user until the user image meets the specified condition.

4. The method of claim 1, further comprising:
   determining user position information according to the user image;
   correspondingly, the in response to determining that the user image meets a specified condition, determining the user image as the iris recognition image comprises:
   in response to determining that the line of sight and a specified line of sight meet the specified condition and that the user position information and a preset position meet the specified condition, determining the user image as the iris recognition image; and
   correspondingly, the specified condition comprises that a line of sight angle difference is within a first preset range and a position difference is within a third preset range.

5. The method of claim 4, wherein the determining user position information according to the user image comprises:
   determining an eye size according to an eye feature in the user image; and
   determining the user position information according to the eye size and a preset size comparison table, wherein the user position information comprises distance information.

6. A non-transitory computer-readable storage medium storing computer programs, wherein when the programs are executed by a processor, the processor implements the method for determining the iris recognition image of claim 1.

7. The non-transitory computer-readable storage medium of claim 6, wherein the specified condition comprises at least one of: a line of sight angle difference is within a first preset range, or a coordinate difference is within a second preset range.

8. The non-transitory computer-readable storage medium of claim 6, wherein when the programs are executed by a processor, the processor further implements:
in response to determining that the user image does not meet the specified condition, returning to acquire the line of sight of the user until the user image meets the specified condition.

9. The non-transitory computer-readable storage medium of claim 6, wherein when the programs are executed by a processor, the processor further implements: determining user position information according to the user image;
correspondingly, the in response to determining that the user image meets a specified condition, determining the user image as the iris recognition image comprises:
in response to determining that the line of sight and a specified line of sight meet the specified condition and that the user position information and a preset position meet the specified condition, determining the user image as the iris recognition image; and
correspondingly, the specified condition comprises that a line of sight angle difference is within a first preset range and a position difference is within a third preset range.

10. The non-transitory computer-readable storage medium of claim 9, wherein the determining user position information according to the user image comprises:
determining an eye size according to an eye feature in the user image; and
determining the user position information according to the eye size and a preset size comparison table, wherein the user position information comprises distance information.

11. A device for determining an iris recognition image, comprising:
a line of sight detection module, which is configured to detect a line of sight of a user;
an image acquisition module, which is configured to acquire a user image based on the line of sight of the user; and
an image determination module, which is configured to:
in response to determining that the user image meets a specified condition, determine the user image as the iris recognition image;
wherein the in response to determining that the user image meets a specified condition, determining the user image as the iris recognition image comprises:
determining coordinates of a corresponding gaze point according to the line of sight of the user; and
in response to determining that the coordinates of the gaze point and coordinates of an image capturing device meet a specified condition, determining the user image as the iris recognition image.

12. The device of claim 11, further comprising:
a returning module, which is configured to: in response to determining that the user image does not meet the specified condition, return to acquire the line of sight of the user until the user image meets the specified condition.

13. A terminal apparatus, comprising:
one or more processors; and
a storage device, which is configured to store one or more programs;
wherein in a case where the one or more programs are executed by the one or more processors, the one or more processors are enabled to implement:
detecting a line of sight of a user;
acquiring a user image based on the line of sight of the user; and
in response to determining that the user image meets a specified condition, determining the user image as an iris recognition image;
wherein the in response to determining that the user image meets a specified condition, determining the user image as the iris recognition image comprises:
determining coordinates of a corresponding gaze point according to the line of sight of the user; and
in response to determining that the coordinates of the gaze point and coordinates of an image capturing device meet a specified condition, determining the user image as the iris recognition image.

14. The terminal apparatus of claim 13, wherein the specified condition comprises at least one of: a line of sight angle difference is within a first preset range, or a coordinate difference is within a second preset range.

15. The terminal apparatus of claim 13, wherein in a case where the one or more programs are executed by the one or more processors, the one or more processors are further enabled to implement:
in response to determining that the user image does not meet the specified condition, returning to acquire the line of sight of the user until the user image meets the specified condition.

16. The terminal apparatus of claim 13, wherein in a case where the one or more programs are executed by the one or more processors, the one or more processors are further enabled to implement: determining user position information according to the user image;
correspondingly, the in response to determining that the user image meets a specified condition, determining the user image as the iris recognition image comprises:
in response to determining that the line of sight and a specified line of sight meet the specified condition and that the user position information and a preset position meet the specified condition, determining the user image as the iris recognition image; and
correspondingly, the specified condition comprises that a line of sight angle difference is within a first preset range and a position difference is within a third preset range.

17. The terminal apparatus of claim 16, wherein the determining user position information according to the user image comprises:
determining an eye size according to an eye feature in the user image; and
determining the user position information according to the eye size and a preset size comparison table, wherein the user position information comprises distance information.

* * * * *